June 24, 1969   F. S. T. FUNG ET AL   3,451,878
LAMINATED ARTICLE WITH DECORATIVE DOTS DISPERSED THERETHROUGH
Filed March 29, 1965
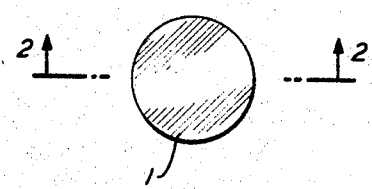
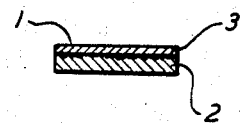
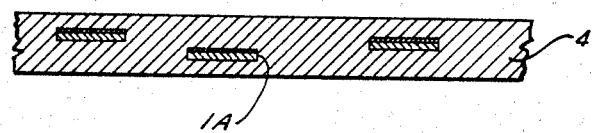
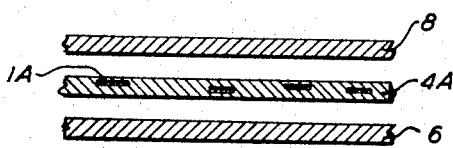
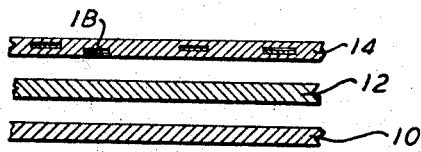
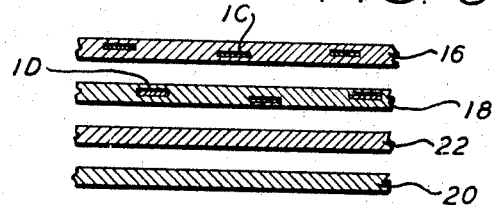
INVENTORS
FREDERICK S. T. FUNG
RANDALL H. DOUGHTY
BY
ATTORNEY

United States Patent Office 3,451,878
Patented June 24, 1969

3,451,878
LAMINATED ARTICLE WITH DECORATIVE DOTS DISPERSED THERETHROUGH
Frederick S. T. Fung, 29 Charlton St., Lunenburg, Mass. 01462, and Randall H. Doughty, 225 Walton St., Fitchburg, Mass. 01420
Filed Mar. 29, 1965, Ser. No. 443,241
Int. Cl. B44f 5/00; B32b 29/00
U.S. Cl. 161—5     5 Claims This invention relates to a decorative laminated paper and more particularly, to the inclusion of decorative paper particles in one or several of the paper laminations.

Laminated paper is made by stacking sheets of paper impregnated with thermosetting resin in a press, and curing the resin with heat and pressure. In accordance with the present invention, decorative paper particles are dispersed in one or several of the sheets of paper. The decorative paper particles are disposed at various depths within the laminated paper, thereby producing the three-dimensional effect. In addition, decorative paper particles of one color produce various color effects due to the variation in the depths at which they are disposed within the laminated paper.

Foreign particles within sheets to be laminated can cause blistering in the final product. In accordance with the present invention, the thermosetting resin impregnates the decorative paper particles, thereby minimizing any blistering after lamination.

An object of the present invention is to provide a decorative laminated paper for use in decorative laminates on walls or other surfaces.

Another object of the present invention is to provide a decorative laminated paper having decorative elements dispersed therein at various depths to produce a three-dimensional effect and to vary the color effect of like colored particles.

Another object of the present invention is to provide decorative elements formed of paper so as to allow a thermosetting resin to impregnate the decorative elements.

Another object of the present invention is to provide a decorative element for inclusion in a paper lamination comprising a base sheet having a coating thereon which incompletely penetrates the base sheet leaving it sufficiently unsaturated for penetration by a thermosetting resin thereby decreasing the possibility of blistering or dimensional change during the lamination process.

These and other objects and features of the invention are pointed out in the following description in terms of the embodiments thereof which are shown in the accompanying drawing. It is to be understood, however, that the drawing is for the purpose of illustration only and is not a definition of the limits of the invention, reference being had to the appended claims for this purpose.

FIG. 1 illustrates an enlarged plan view of a decorative element constructed in accordance with the present invention.

FIG. 2 shows an enlarged sectional view of a decorative element 1 taken through 2—2 of FIG. 1.

FIG. 3 shows an enlarged cross-sectional view of paper sheet having individual decorative elements distributed substantially uniformally throughout.

FIG. 4 illustrates an exploded view of the laminate containing a print sheet of the type illustrated in FIG. 3.

FIG. 5 shows an exploded view of a laminate containing an overlay sheet having individual decorative particles distributed substantially uniformly throughout.

FIG. 6 shows an exploded view of a laminate having two overlay sheets which contain decorative particles.

Referring to FIG. 1, a decorative element 1 formed in accordance with the present invention is shown. The particle shown in FIG. 1 is a circular shape. However, it is to be understood that the particles may be of any desired shape such as hexagonal, rectangular, square, etc.

As shown in FIG. 2, decorative element 1 comprises a paper base 2 having an ink coating 3 thereon. The coating 3 penetrates the paper base 2 only to the extent required for proper binding leaving the remainder of paper base 2 unsaturated.

The coating 3 may be any well known commercially available high solids laminating grade inks which resists change in color or stability in laminating processes.

The extent of penetration by coating 3 will depend upon the coating weight and structure of paper base 2 and more particularly, the porosity of the paper base 2. It has been found that papers having a Gurley densometer value in the range of less than 70 seconds and greater than 20 seconds for 400 milliliters of air are of suitable porosity. The coating weight should be no greater than 15 lbs. per 3,000 square feet. By keeping the coating weight and the porosity of base paper within the foregoing ranges, the coating 3 penetrates the base sheet to a sufficient extent for binding purposes but not so completely as to completely saturate the base sheet. This leaves sufficient area in the finished coated paper available for penetration by a thermosetting resin.

The inclusion of foreign particles, which are not capable of absorbing the thermosetting resin, in lamination layers are responsible for blisters in laminates. The laminate fails by delamination in the area of the particle. Since the decorative dots of the present invention are capable of absorbing the resin, the blistering possibility is greatly decreased.

Referring to FIG. 3, decorative elements, of the type shown in FIG. 2, are shown at 1A dispersed within a colored or otherwise decorated paper sheet 4 commonly referred to as a print sheet when employed in a paper laminate as shown in FIG. 4.

An exploded view of individual plies of a typical paper laminate is illustrated in FIG. 4. The laminate shown in FIG. 4 is for purposes of illustration and it is to be understood that one or several more layers may be added to the laminate for purposes well known in the art. This laminate comprises a core sheet 6, a print sheet 4A and an overlay sheet 8.

Core sheet 6 comprises an unbleached kraft paper impregnated with a thermosetting resin such as phenolformaldehyde resin or the like. The overlay sheet 8 and print sheet 4A made of paper comprising alpha pulp, rayon or similar natural or synthetic fibers or mixtures thereof. The overlay sheet becomes transparent or translucent when impregnated with resin and cured. Print sheet 4A is manufactured with the inclusion of an inorganic pigment or mixtures of inorganic pigments making possible a wide variety of colors. The pigments employed are well-known in the art and incude, e.g., titanium dioxide (white), cadmium sulfide (yellow), etc. The greater the amount of pigment in the print sheet 4A, a greater amount of light is blocked out as the distance of the decorative element 1A is increased from the surface of the sheet 4A. Due to the partial hiding power of print sheet 4A and due to the various depths at which the particles are disposed, the inclusion of the decorative elements 1A in sheet 4A produces a three-dimensional effect.

As shown in FIG. 5, the decorative particles may be included in the overlay sheet of a paper laminate. The laminate shown in FIG. 5 comprises a base core sheet 10, a print sheet 12, and a transparent overlay sheet 14 having decorative particles 1B dispersed therethrough.

The overlay sheet 14 is oversaturated with a thermosetting resin to get good protection against wear. By oversaturating the overlay sheet, all available areas in the decorative particles 1B will be saturated with thermosetting resin thereby greatly minimizing the possibility of delamination to an even greater extent than when the decorative particles are included in the print sheet. The lower print sheet 12 in the laminate can not be oversaturated as such would result in a laminate having poor mechanical properties due to the presence of excessive amounts of the hard and brittle thermosetting resin in the body of the laminate.

A decorative laminate having two transparent overlay sheets 16 and 18 is shown in FIG. 6 The laminate includes a base core sheet 20 and an intermediate print sheet 22. The overlay sheets 16 and 18 have decorative particles 1C and 1D, respectively dispersed therethrough. By this arrangement, a 3D effect is produced and in addition, the decorative effect produced can be precisely controlled since the contrast in color of particles 1C relative to particles 1D can be as desired.

While the decorative particles have been shown as dispersed in the paper laminations, it is within the scope of the present invention that the decorative dots be disposed on or near the upper surface of the print sheet 4A shown in FIG. 4A or on the internal surfaces of the overlay sheets shown in FIGS. 5 and 6.

The decorative particles may be incorporated into a paper sheet in any conventional manner. For example, the decorative particles may be directly mixed with the pulp stock immediately prior to its introduction into the head box of a paper machine. When it is desired that the decorative elements be placed primarily on or near one surface of the paper layer, pulp stock, containing decorative elements, is introduced on to a partially formed paper on a fourdrinier wire by the use of a conventional secondary headbox.

While several embodiments of the invention have been illustrated and described in detail, it is to be expressly understood that various changes in the form and relative arrangement of the part, which will now appear to those skilled in the art, may be made without departing from the scope of the invention. Reference is, therefore, to be had to the appended claims for a definition of the limits of the invention.

What is claimed is:

1. A heat and pressure consolidated laminated article comprising a plurality of fibrous sheets impregnated and bonded together with a thermosetting resin, decorative particles disposed in one of said sheets and impregnated with said thermosetting resin, said decorative particles comprising paper particles having a decorative coating thereon, said paper particles having a Gurley densometer value in the range of less than 70 seconds and greater than 20 seconds for 400 milliliters of air.

2. A heat and pressure consolidated laminated article comprising a plurality of fibrous sheets impregnated and bonded together with a thermosetting resin, decorative paper particles disposed in one of said sheets and impregnated with said thermosetting resin, said decorative particles including paper particles having a decorative coating thereon, said coating having a weight of less than 15 pounds per 3,000 square feet.

3. A heat and pressure consolidated laminated article comprising a plurality of fibrous sheets impregnated and bonded together with a thermosetting resin, decorative paper particles disposed in one of said sheets and impregnated with said thermosetting resin, said fibrous sheets including a print sheet, said print sheet including inorganic pigments, said decorative particles being disposed at various depth within said print sheet, whereby due partially to the hiding power of said inorganic pigments and due partially to the various depths at which said decorative particles are disposed, a three dimensional effect is produced.

4. A heat and pressure consolidated laminated article comprising a plurality of fibrous sheets impregnated and bonded together with a thermosetting resin, decorative paper particles disposed in one of said sheets and impregnated with said thermosetting resin, said fibrous sheets include a print sheet and an overlay sheet, said decorative particles being disposed in said print sheet and in said overlay sheet, whereby a three dimensional effect is produced.

5. A heat and pressure consolidated laminated article comprising a plurality of fibrous sheets impregnated and bonded together with a thermosetting resin, decorative paper particles disposed in one of said sheets and impregnated with said thermosetting resin, wherein said fibrous sheets include a plurality of adjacent transparent overlay sheets, each of said transparent overlay sheets including decorative particles thereby producing a three dimensional effect.

References Cited

UNITED STATES PATENTS

| | | | |
|---|---|---|---|
| 1,886,928 | 11/1932 | Wyss | 156—276 X |
| 3,265,548 | 8/1966 | Harkins et al. | 156—301 X |
| 2,620,853 | 12/1952 | Boese | 161—413 |
| 2,816,851 | 12/1957 | Arledter | 161—413 |
| 2,801,198 | 7/1957 | Morris et al. | 161—263 |
| 447,336 | 3/1891 | Macdonough. | |

FOREIGN PATENTS 213,205   2/1958   Australia.

J. H. STEINBERG, *Primary Examiner.*

U.S. Cl. X.R.

161—162, 413, 126, 134, 140, 162